(12) United States Patent
Mu

(10) Patent No.: US 12,507,244 B2
(45) Date of Patent: Dec. 23, 2025

(54) METHOD AND DEVICE FOR TRANSMITTING PHYSICAL DOWNLINK CONTROL CHANNEL

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 524 days.

(21) Appl. No.: 17/923,752

(22) PCT Filed: May 8, 2020

(86) PCT No.: PCT/CN2020/089234
§ 371 (c)(1),
(2) Date: Nov. 7, 2022

(87) PCT Pub. No.: WO2021/223230
PCT Pub. Date: Nov. 11, 2021

(65) Prior Publication Data
US 2023/0209559 A1    Jun. 29, 2023

(51) Int. Cl.
*H04L 1/08* (2006.01)
*H04W 72/23* (2023.01)

(52) U.S. Cl.
CPC .................................. *H04W 72/23* (2023.01)

(58) Field of Classification Search
CPC ....... H04L 5/0091; H04L 5/0053; H04L 1/08; H04L 1/189; H04L 5/006; H04W 72/23
See application file for complete search history.

(56) References Cited

U.S. PATENT DOCUMENTS

| | | | |
|---|---|---|---|
| 2016/0249331 A1 | 8/2016 | Park et al. | |
| 2019/0182807 A1* | 6/2019 | Panteleev | H04L 5/0048 |
| 2021/0105752 A1* | 4/2021 | Taherzadeh Boroujeni | H04W 72/23 |
| 2021/0329647 A1* | 10/2021 | Park | H04W 56/001 |
| 2021/0400644 A1* | 12/2021 | Islam | H04L 5/0094 |
| 2022/0038207 A1* | 2/2022 | Frenne | H04L 5/0053 |

(Continued)

FOREIGN PATENT DOCUMENTS

| | | |
|---|---|---|
| CN | 104811409 A | 7/2015 |
| EP | 3098998 A1 | 11/2016 |
| WO | WO 2019047680 A1 | 3/2019 |

OTHER PUBLICATIONS

PCT/CN2020/089234 English translation of International Search Report dated Jan. 27, 2021, 2 pages.

(Continued)

*Primary Examiner* — Andrew Lee
(74) *Attorney, Agent, or Firm* — Cozen O'Connor

(57) ABSTRACT

A method for transmitting a physical downlink control channel is performed by a base station, which in the transmission process of a physical downlink control channel, sends a search space configuration parameter of a terminal, the search space configuration parameter including a quantity of repeated transmissions; determines at least one candidate time unit corresponding to the quantity of repeated transmissions according to the search space configuration parameter; and transmits the PDCCH to the terminal on a target time unit in the at least one candidate time unit according to the quantity of repeated transmissions.

13 Claims, 5 Drawing Sheets

(56) References Cited

U.S. PATENT DOCUMENTS

2022/0132341 A1* 4/2022 Lee .................. H04W 72/1263
2022/0369298 A1* 11/2022 Lin ..................... H04L 5/0087

OTHER PUBLICATIONS

Indian Patent Application No. 202247069105, Office Action dated Feb. 20, 2023, 7 pages.
European Patent Application No. 20934500.8, Search and Opinion dated Jan. 30, 2024, 10 pages.
LG Electronics "PDCCH transmission for MTC coverage enhancement" 3GPP TSG RAN WG1 Meeting #75, R1-135461, Nov. 2013, 5 pages.

* cited by examiner

METHOD AND DEVICE FOR TRANSMITTING PHYSICAL DOWNLINK CONTROL CHANNEL

CROSS-REFERENCE TO RELATED APPLICATION

This application is the US national phase application of International Application No. PCT/CN2020/089234, filed on May 8, 2020, the entire contents of which are incorporated herein by reference for all purposes.

TECHNICAL FIELD

The disclosure relates to the field of wireless communication technologies, and in particular, to a method and an apparatus for transmitting a physical downlink control channel and a storage medium.

BACKGROUND

Machine Type Communication (MTC) and Narrow Band Internet of Things (NB-IoT), as representatives of the cellular Internet of Things, are widely used in data collection, intelligent transportation and other fields. Coverage is one of the key factors that operators consider when commercializing cellular networks.

For the NR-lite (simplified new radio system) terminal, due to reduction of capacity, coverage may be lost, and thus PDCCH (Physical Downlink Control Channel) needs to be enhanced for coverage.

SUMMARY

According to a first aspect of the present disclosure, a method for transmitting a physical downlink control channel is provided. The method includes:

sending a search space configuration parameter for a terminal, wherein the search space configuration parameter includes a quantity of repeated transmissions;

determining at least one candidate time unit corresponding to the quantity of repeated transmissions based on the search space configuration parameter; and transmitting, on a target candidate time unit, a Physical Downlink Control Channel (PDCCH) to the terminal based on the quantity of repeated transmissions, wherein the target candidate time unit is any one of the at least one candidate time unit.

According to a second aspect of the present disclosure, a method for transmitting a physical downlink control channel is provided. The method includes:

obtaining a search space configuration parameter for a terminal sent by a base station, wherein the search space configuration parameter includes a quantity of repeated transmissions;

determining at least one candidate time unit corresponding to the quantity of repeated transmissions based on the search space configuration parameter; and performing blind detection of Physical Downlink Control Channel (PDCCH) on the at least one candidate time unit sequentially based on the quantity of repeated transmissions.

According to a third aspect of embodiments of the present disclosure, a base station is provided. The base station includes:

a processor;

a transceiver connected to the processor; and a memory for storing instructions executable by the processor;

wherein the process is configured to:

send a search space configuration parameter for a terminal, wherein the search space configuration parameter includes a quantity of repeated transmissions;

determine at least one candidate time unit corresponding to the quantity of repeated transmissions based on the search space configuration parameter; and transmit, on a target candidate time unit, a Physical Downlink Control Channel (PDCCH) to the terminal based on the quantity of repeated transmissions, wherein the target candidate time unit is any one of the at least one candidate time unit.

According to a fourth aspect of embodiments of the present disclosure, a terminal is provided. The terminal includes:

a processor;

a transceiver connected to the processor; and a memory for storing instructions executable by the processor;

wherein the process is configured to:

obtain a search space configuration parameter for a terminal sent by a base station, wherein the search space configuration parameter includes a quantity of repeated transmissions;

determine at least one candidate time unit corresponding to the quantity of repeated transmissions based on the search space configuration parameter; and perform blind detection of Physical Downlink Control Channel (PDCCH) on the at least one candidate time unit sequentially based on the quantity of repeated transmissions.

It should be understood that the above general description and the following detailed description are only illustrative and do not limit the disclosure.

BRIEF DESCRIPTION OF THE DRAWINGS

The drawings herein are incorporated into the specification and form a part of the specification, showing embodiments in accordance with the disclosure, and are used together with the specification to explain the principles of the disclosure.

DETAILED DESCRIPTION

Figure 1:
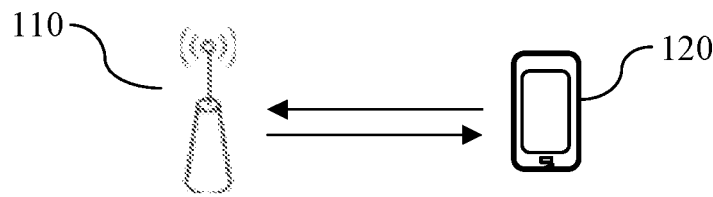
FIG. 1 shows a schematic diagram of a system for transmitting a physical downlink control channel provided by an embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

It should be understood that "several" mentioned in this disclosure refers to one or more, and "multiple" refers to two or more. "And/or" describes the association relationship of association objects, indicating that there can be three kinds of relationships, for example, A and/or B, which can indicate that there are three cases: A alone, A and B together, and B alone. The character "/" generally indicates that the context object is an "or" relationship.

The disclosure provides a method for transmitting a physical downlink control channel (PDCCH). The method for transmitting a physical downlink control channel realizes the solution to the problem of repeated transmission of PDCCH. Next, the method for transmitting a physical downlink control channel involved in embodiments of the disclosure will be introduced in detail in combination with the drawings.

First, some terms involved in this disclosure will be explained.

1) NR Lite (Simplified New Radio System)

In the LTE 4G (Long Term Evolution 4G) system, MTC (Machine Type Communication) and NB-IoT (Narrow Band Internet of Things) are proposed to support the Internet of Things business. These two technologies are mainly aimed at low rate, high latency and other scenarios. However, no matter how NB-IoT and MTC evolve, they belong to low power consumption wide area IoT networks. Their basic capabilities of low power consumption, low cost, wide coverage and large connectivity remain unchanged. Therefore, they are mainly oriented to "low-end IoT application scenarios" with low data transmission rate and high delay, such as intelligent parking, intelligent meter reading, intelligent street lamps, etc. On the other hand, with the continuous development of the Internet of Things business, services such as video monitoring, smart home, wearable devices and industrial sensor monitoring have been popularized. These services usually require the rate of tens to hundreds of megabytes, and also have relatively high requirements for delay. MTC and NB-IoT technologies in LTE are difficult to meet the requirements. Based on this situation, the requirements for designing a new Internet of Things technology in the 5G new radio to cover this mid-range Internet of Things equipment are proposed.

2) PDCCH (Physical Downlink Control Channel)

In the protocol of air interface, physical channels, transmission channels and logical channels are defined. The logical channel describe the type of information, that is, it defines what information is transmitted. The transmission channel describes the transmission mode of information, that is, it defines how information is transmitted. The physical channel is used by the physical layer for the transmission of specific signals.

The physical channels include PDCCH, PUSCH (Physical Uplink Shared Channel), PDSCH (Physical Downlink Shared Channel), and PUCCH (Physical Uplink Control Channel). DCI (Downlink Control Information) can be transmitted through PDCCH.

3) Search Space

The search space is a concept introduced by the NR (New Radio) standard to limit the maximum number of blind decoding attempts at the terminal without imposing restrictions on the scheduler as much as possible.

A search space is a group of candidate control channels composed of CCEs (Control Channel Elements) with the same aggregation level. Because there are multiple aggregation levels, a terminal will have multiple search spaces. A CORESET (control resource set) may also have multiple search spaces, and a terminal may be configured with multiple CORESETs. The terminal will not attempt to decode PDCCH beyond the activated bandwidth part. In addition, the listening object of the search space can also be configured. In a monitoring occasion configured for the search space, the terminal will try to decode the candidate PDCCH in the search space to obtain the corresponding DCI.

The NR standard defines a total of five different aggregation levels: 1, 2, 4, 8, and 16 CCEs, that is, five search spaces. The maximum number of candidate PDCCHs that can be supported in each search space (or each aggregation level) can be configured. Therefore, NR can flexibly allocate different blind decoding times at different aggregation levels.

Referring to FIG. 1, which shows a schematic diagram of a system for transmitting a PDCCH provided by an embodiment of the present disclosure. As shown in FIG. 1, the system for transmitting a PDCCH may include: a base station 110 and a terminal 120.

The terminal 120 may be a device that provides voice and/or data connectivity to the user. The terminal 120 may communicate with one or more core networks via a Radio Access Network (RAN), and the terminal 120 may be an IoT terminal such as a sensor device, a mobile phone (or "cellular" phone) and a computer of the IoT terminal, for example, may be a fixed, portable, pocket, hand-held, computer built-in or a vehicle-mounted device, for example, Station (STA), subscriber unit, subscriber station, mobile station, mobile, remote station, access point, remote terminal, access terminal, user terminal, user agent, user device, or user equipment (UE). Alternatively, the terminal 120 may also be a device of an unmanned aerial vehicle.

The base station 110 may be a network-side device in the wireless communication system. The wireless communication system may be a 5G system, also known as new radio (NR) system. Alternatively, the wireless communication system may also be a next-generation system of the 5G system. Alternatively, it may also be a NR-lite system.

The base station 110 may be an evolved base station (eNB) used in the 5G system. When the base station 110 adopts the centralized-distributed architecture, it usually includes a central unit (CU) and at least two distributed units (DUs). The central unit is provided with protocol stacks of a Packet Data Convergence Protocol (PDCP) layer, a Radio Link Control (RLC) layer, and a Media Access Control (MAC) layer; a physical (PHY) layer protocol stack is provided in the distributed unit, and the specific implementation of the base station 110 is not limited in embodiments of the present disclosure.

A wireless connection can be established between the base station 110 and the terminal 120 through a radio air interface. In different embodiments, the radio air interface is a radio air interface based on the fifth generation mobile communication network technology (5G) standard, such as a new air interface; or, the radio air interface may also be a radio air interface based on a next-generation mobile communication network technology standard of 5G.

In the next generation communication system (such as 5G, or New Radio, NR), the terminal acquires the control resource set (CORESET) configured by high-level signaling, determines the search space set according to the high-level signaling, and determines the control channel element (CCE) where the candidate control channel is located according to the configuration information of the search space set.

For the NR-lite terminal, coverage loss is caused by capacity reduction, so PDCCH needs to be enhanced for coverage, and the basic means of coverage enhancement is repeated transmission. When repeated transmission is introduced, the original structure and configuration method of search space applicable to single transmission will no longer be applicable. Therefore, in order to achieve repeated transmission of PDCCH, the disclosure provides a method for transmitting a physical downlink control channel. Please refer to FIG. 2, which shows a flow chart of a method for transmitting a physical downlink control channel provided by an embodiment of the disclosure. The method for transmitting a physical downlink control channel can be applied to the system for transmitting a physical downlink control channel shown in FIG. 1, performed by the base station in FIG. 1. The method may include the following steps.

At step 210, a search space configuration parameter for a terminal is sent, in which the search space configuration parameter includes a quantity of repeated transmissions.

At step 220, at least one candidate time unit corresponding to the quantity of repeated transmissions is determined according to the search space configuration parameter.

In one possible implementation, each quantity of repeated transmissions corresponds to at least one candidate time unit. The correspondence between the quantity of repeated transmissions and the candidate time unit is fixed by the communication protocol, or is configured by the base station based on channel conditions through high-level signaling. For example, when the quantity of repeated transmissions is 4, one candidate time unit is configured, or two candidate time units are configured.

At step 230, a physical downlink control channel (PDCCH) is transmitted to the terminal on a target candidate time unit according to the quantity of repeated transmissions. The target candidate time unit is any one of at least one candidate time unit.

In one possible implementation, each candidate time unit includes N time subunits, and N is determined by the quantity of repeated transmissions;

transmitting the PDCCH to the terminal on the target candidate time unit according to the quantity of repeated transmissions, includes:

repeatedly transmitting the PDCCH to the terminal on N time subunits in the target candidate time unit.

In one possible implementation, determining at least one candidate time unit corresponding to the quantity of repeated transmissions according to the search space configuration parameter, includes:

determining a start time position of at least one candidate time unit according to the quantity of repeated transmissions;

determining N time subunits respectively starting from the start time position of at least one candidate time unit as at least one candidate time unit corresponding to the quantity of repeated transmissions.

In one possible implementation, the search space configuration parameter includes an aggregation level corresponding to the quantity of repeated transmissions;

before repeatedly transmitting the PDCCH to the terminal on N time subunits in the target candidate time unit, the method further includes:

determining the aggregation level, and determining at least one candidate transmission location in the control resource set according to the determined aggregation level;

repeatedly transmitting the PDCCH to the terminal on N time subunits in the target candidate time unit, includes:

transmitting the PDCCH to the terminal once respectively on corresponding target candidate transmission locations of the N time subunits in the target candidate time unit;

wherein, the target candidate transmission location is any one of at least one candidate transmission location.

In one possible implementation, the search space configuration parameter includes at least two aggregation levels, and each aggregation level corresponds to at least one quantity of repeated transmissions;

the at least two aggregation levels correspond to a same quantity of repeated transmissions;

or, the at least two aggregation levels correspond to different quantities of repeated transmissions.

In one possible implementation, a correspondence between the aggregation level and the quantity of repeated transmissions is preset;

or, the correspondence between the aggregation level and the quantity of repeated transmissions is configured by the base station.

In one possible implementation, the at least two candidate transmission locations corresponding to the same aggregation level support the same quantity of repeated transmissions;

or, the at least two candidate transmission locations corresponding to the same aggregation level support different quantities of repeated transmissions.

In one possible implementation, the quantity of repeated transmission supported by each of at least two candidate transmission locations corresponding to the same aggregation level is preset;

or, the quantity of repeated transmissions supported by each of at least two candidate transmission locations corresponding to the same aggregation level is configured by the base station.

In one possible implementation, when the search space configuration parameter contains at least two quantities of repeated transmissions, the at least two quantities of repeated transmissions correspond to a same number of candidate time units;

or, the at least two quantities of repeated transmissions correspond to different number of candidate time units.

In one possible implementation, the number of candidate time units corresponding to the quantity of repeated transmissions is preset;

or, the number of candidate time units corresponding to the quantity of repeated transmissions is configured by the base station.

To sum up, in the method for transmitting the physical downlink control channel provided by the present disclosure, the base station sends the search space configuration parameter containing the quantity of repeated transmissions during the transmission of the physical downlink control channel, determines at least one candidate time unit corresponding to the quantity of repeated transmissions according to the search space configuration parameter, and transmits PDCCH to the terminal on the target time unit of at least one candidate time unit according to the quantity of repeated transmissions. Thus, the repeated transmission of PDCCH is realized.

Figure 3:
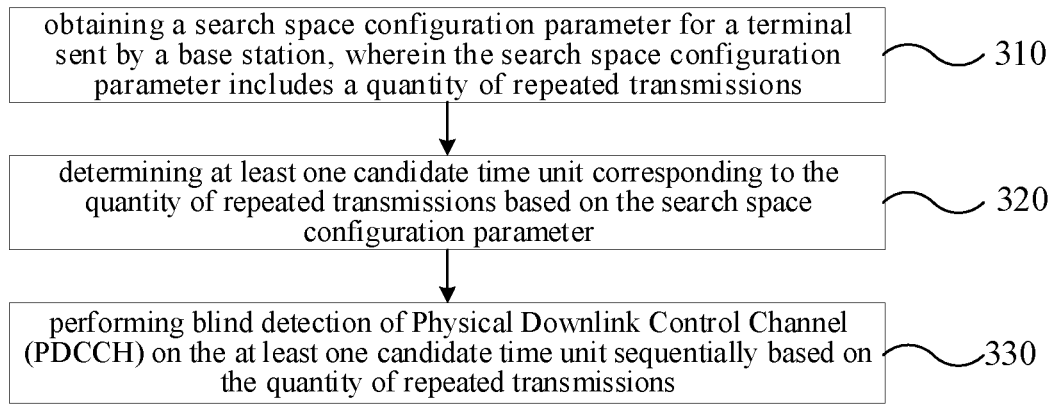
FIG. 3 shows a flow chart of a method for transmitting a physical downlink control channel provided by an embodiment of the present disclosure.

Please refer to FIG. 3, which shows a flow chart of a method for transmitting a physical downlink control channel provided by an embodiment of the present disclosure. The method for transmitting a physical downlink control channel can be applied to the system for transmitting a physical downlink control channel shown in FIG. 1, and performed by the terminal in FIG. 1. The method may include the following steps.

At step 310, a search space configuration parameter for the terminal sent by the base station is obtained, and the search space configuration parameter includes a quantity of repeated transmissions.

At step 320, at least one candidate time unit corresponding to the quantity of repeated transmissions is determined according to the search space configuration parameter.

At step 330, blind detection of PDCCH is performed on the at least one candidate time unit sequentially according to the quantity of repeated transmissions.

When the base station transmits PDCCH to the terminal and the terminal receives the PDCCH transmitted by the base station, the base station uses any of the candidate time units as the target candidate time unit, and conducts PDCCH transmission based on the target candidate time unit. However, the terminal can only determine the possible candidate time units according to the search space configuration parameter, and cannot determine which of the candidate time unit terminals the base station is based on for PDCCH transmission, Therefore, when the terminal receives PDCCH, it is necessary to perform blind detection on N time subunits corresponding to each of all possible candidate time units corresponding to the terminal until PDCCH corresponding to the terminal is detected.

In one possible implementation, each candidate time unit includes N time subunits, and N is determined by the quantity of repeated transmissions;

performing blind detection of PDCCH on at least one candidate time unit sequentially according to the quantity of repeated transmissions, includes:

performing blind detection of PDCCH on N time subunits corresponding to each of at least one candidate time unit sequentially.

In one possible implementation, determining the at least one candidate time unit corresponding to the quantity of repeated transmissions according to the search space configuration parameter, includes:

determining a start time position of the at least one candidate time unit according to the quantity of repeated transmissions;

determining the N time subunits respectively starting from the start time position of the at least one candidate time unit as at least one candidate time unit.

In one possible implementation, the search space configuration parameter includes an aggregation level corresponding to the quantity of repeated transmissions;

before performing blind detection of PDCCH on at least one candidate time unit sequentially, the method further includes:

determining the aggregation level, and determining at least one candidate transmission location in the control resource set according to the determined aggregation level;

performing the blind detection of PDCCH on at least one candidate time unit sequentially, includes:

performing the blind detection of PDCCH once respectively at corresponding candidate transmission locations of N time subunits in the at least one candidate time unit.

In one possible implementation, the search space configuration parameter includes at least two aggregation levels, and each aggregation level corresponds to at least one quantity of repeated transmissions;

the at least two aggregation levels correspond to a same quantity of repeated transmissions;

or, the at least two aggregation levels correspond to different quantities of repeated transmissions.

In one possible implementation, a correspondence between the aggregation level and the quantity of repeated transmissions is preset;

or, the correspondence between the aggregation level and the quantity of repeated transmissions is configured by the base station.

In one possible implementation, the at least two candidate transmission locations corresponding to the same aggregation level support the same quantity of repeated transmissions;

or, the at least two candidate transmission locations corresponding to the same aggregation level support different quantities of repeated transmissions.

In one possible implementation, the quantity of repeated transmission supported by each of at least two candidate transmission locations corresponding to the same aggregation level is preset;

or, the quantity of repeated transmissions supported by each of at least two candidate transmission locations corresponding to the same aggregation level is configured by the base station.

In one possible implementation, when the search space configuration parameter contains at least two quantities of repeated transmissions, the at least two quantities of repeated transmissions correspond to a same number of candidate time units;

or, the at least two quantities of repeated transmissions correspond to different number of candidate time units.

In one possible implementation, the number of candidate time units corresponding to the quantity of repeated transmissions is preset;

or, the number of candidate time units corresponding to the quantity of repeated transmissions is configured by the base station.

To sum up, in the method for transmitting the physical downlink control channel provided by the present disclosure, the terminal obtains the search space configuration parameter for the terminal containing the quantity of repeated transmissions sent by the base station during the transmission of the physical downlink control channel, and determines at least one candidate time unit corresponding to the quantity of repeated transmissions according to the search space configuration parameter, and performs the blind detection of PDCCH on the at least one candidate time unit sequentially according to the quantity of repeated transmissions, thus realizing the repeated transmission of PDCCH.

Figure 4:
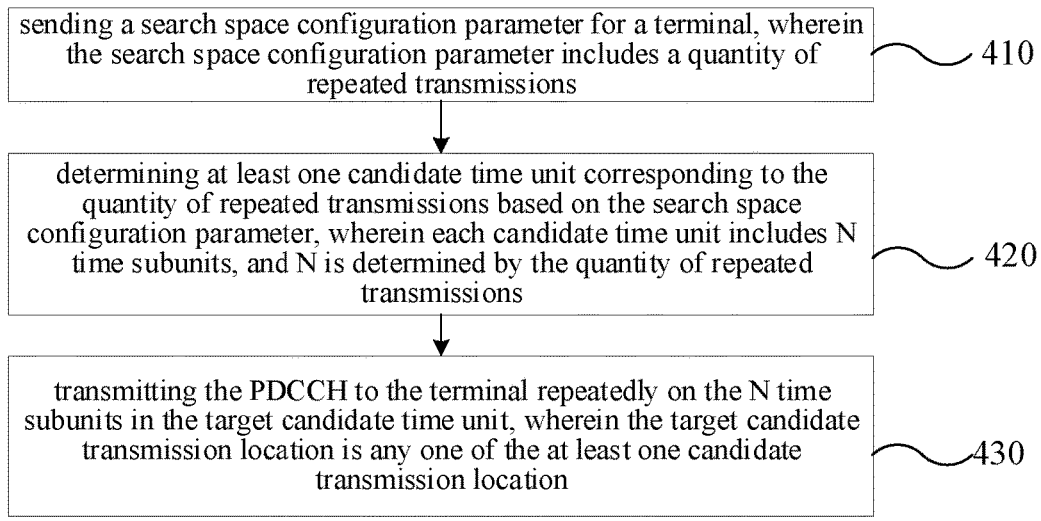
FIG. 4 shows a flow chart of a method for transmitting a physical downlink control channel provided by an embodiment of the present disclosure.

Please refer to FIG. 4, which shows a flow chart of a method for transmitting a physical downlink control channel provided by an embodiment of the present disclosure. The method for transmitting the physical downlink control channel can be applied to the system for transmitting the physical downlink control channel shown in FIG. 1, and performed by the base station in FIG. 1. The method may include the following steps.

At step 410, a search space configuration parameter for a terminal is sent, and the search space configuration parameter includes a quantity of repeated transmissions.

In one possible implementation, the search space configuration parameter includes at least one quantity of repeated transmissions. For example, the search space configuration parameter for the terminal may include two quantities of repeated transmissions. The number of the quantities of repeated transmissions is 2, and the values of the quantities of repeated transmissions are R1 and R2, respectively. R1 and R2 are positive integers.

In one possible implementation, the search space configuration parameter is the resource configuration information corresponding to the terminal that the base station configures based on the terminal. The base station obtains the resource configuration information corresponding to the terminal based on the configured search space configuration parameter for the terminal, selects appropriate configuration resources according to the current channel conditions for PDCCH transmission, and sends the search space configuration parameter to the corresponding terminal.

In one possible implementation, the base station sends the configured search space configuration parameter corresponding to the terminal to the terminal when establishing a connection with the terminal, or a search space configuration parameter update time is preset, and the base station sends the search space configuration parameter to the terminal based on the preset update time.

At step 420, at least one candidate time unit corresponding to the quantity of repeated transmissions is determined according to the search space configuration parameter. Each candidate time unit includes N time subunits, and N is determined by the quantity of repeated transmissions.

In one possible implementation, a candidate time unit is composed of N time subunits. In one possible case, one time subunit refers to one subframe, and one time subunit carries one PDCCH transmission. When the quantity of repeated transmissions of PDCCH is N, one candidate time unit corresponding to the PDCCH transmission contains N subframes. One candidate time unit completes one complete repeated transmission of PDCCH.

In one possible implementation, the base station determines the start time position of at least one candidate time unit according to the number of repeated transmissions, and determines N time subunits respectively starting from the start time position of at least one candidate time unit as at least one candidate time unit corresponding to the quantity of repeated transmissions.

In one candidate time unit, the time subunit with the lowest number is the start time position of the candidate time unit. One candidate time unit can be determined by determining the start time position of the candidate time unit and the quantity of repeated transmissions of the candidate time unit.

In one possible implementation, the formula for determining the starting position of the candidate time unit is:

$$X \bmod(A*R)=a$$

where, X represents the starting position point of the candidate time unit, R represents the quantity of repeated transmissions of PDCCH sent by the base station or detected by the terminal, and A, a are values configured by the base station.

The above formula is explained only by taking the example of determining the starting position point of the candidate time unit according to the quantity of repeated transmissions. Optionally, the starting position point of the candidate time unit may also be determined in combination with the quantity of repeated transmissions and other information. For example, the starting position point of the candidate time unit may be determined in combination with the quantity of repeated transmissions and the number of candidate time units.

In one possible implementation, when the search space configuration parameter includes at least two quantities of repeated transmissions, the at least two quantities of repeated transmissions correspond to the same number of candidate time units;

For example, when the search space configuration parameter contains two quantities of repeated transmissions, and the two quantities of repeated transmissions are 4 and 8 respectively, the number of candidate time units corresponding to both of them is A1, or A2, where A1 is not equal to A2.

Or, the at least two quantities of repeated transmissions correspond to different number of candidate time units.

For example, when the search space configuration parameter contains two quantities of repeated transmissions, and the two quantities of repeated transmissions are 4 and 8 respectively, the number of candidate time units corresponding to the quantity of repeated transmissions of 4 is A1, and the number of candidate time units corresponding to the quantity of repeated transmissions of 8 is A2, where A1 is not equal to A2.

In one possible implementation, the number of candidate time units corresponding to the quantity of repeated transmissions is preset;

or,

The number of candidate time units corresponding to the quantity of repeated transmissions is configured by the base station.

In one possible implementation, when the number of candidate time units corresponding to the quantity of repeated transmissions is preset, it is set in the communication protocol. After the quantity of repeated transmissions is determined, the number of candidate time units can be determined, making the process of determining the number of candidate time units efficient and fast.

In one possible implementation, when the number of candidate time units corresponding to the quantity of repeated transmissions is configured by the base station, the base station configures the number of candidate time units corresponding to the quantity of repeated transmissions through the search space configuration parameter, or the base station configures the number of candidate time units corresponding to the quantity of repeated transmissions through other signaling. The base station configures the number of candidate time units according to the current occupation of control resources, which has high flexibility.

At step 430, PDCCH is repeatedly transmitted to the terminal on N time subunits in a target candidate time unit. The target candidate time unit is any one of at least one candidate time unit.

In one possible implementation, during PDCCH transmission, the base station selects any one of at least one candidate time units as the target candidate time unit for PDCCH transmission. During the selection of the target candidate time unit, the base station traverses the at least one candidate time units or randomly selects one candidate time unit. If the candidate time unit is not occupied, the candidate time unit is determined as the target candidate time unit, and if the candidate time unit is occupied, the next candidate time unit is reselected, and the occupation situation of the next candidate time unit is determined, and so on, until the target candidate time unit is determined.

In one possible implementation, when performing the PDCCH transmission, in order to achieve repeated transmission, the base station transmits PDCCH once on each time sub unit of the target candidate time unit, that is, the number of time sub units in the target candidate time unit is the quantity of PDCCH repeated transmissions.

To sum up, in the method for transmitting the physical downlink control channel provided by the present disclosure, during the transmission of PDCCH, the base station sends the search space configuration parameter containing the quantity of repeated transmissions, determines at least one candidate time unit corresponding to the quantity of repeated transmissions according to the search space configuration parameter, and transmits PDCCH to the terminal on the target time unit of at least one candidate time unit sequentially according to the quantity of repeated transmissions. Thus, the repeated transmission of PDCCH is realized.

In one possible implementation, the search space configuration parameter further includes the aggregation level corresponding to the quantity of repeated transmissions. Please refer to FIG. 5, which shows a flow chart of a method for transmitting a physical downlink control channel provided by an embodiment of the present disclosure. The method for transmitting the physical downlink control channel is applied to the system for transmitting the physical downlink control channel shown in FIG. 1 and is performed by the base station in FIG. 1. The method includes the following steps.

At step 510, a search space configuration parameter for the terminal is sent, and the search space configuration parameter includes a quantity of repeated transmissions.

In one possible implementation, the search space configuration parameter includes at least two aggregation levels, and each aggregation level corresponds to at least one quantity of repeated transmissions;

the at least two aggregation levels correspond to the same quantity of repeated transmissions;

or, the at least two aggregation levels correspond to different quantities of repeated transmissions.

The basic composition unit of PDCCH in NR is REG (Resource Element Group, which is composed of four REs (Resource Units), namely 1 REG=4 REs). One REG corresponds to the size of one PRB (Physical Resource Block) in the frequency domain (12 REs), and corresponds to the size of one OFDM (Orthogonal Frequency Division Multiplexing) symbol in the time domain. Six REGs will form one CCE.

The aggregation level is used to represent the number of CCEs (Control Channel Elements) that constitute PDCCH. In the current NR system, one PDCCH may be composed of 1, 2, 4, 8, and 16 CCEs, that is, the aggregation level corresponding to PDCCH may be Level 1, Level 2, Level 4, Level 8, and Level 16. The numbers of multiple CCEs included in one PDCCH are consecutive.

In one possible implementation, the search space configuration parameter for the terminal includes one aggregation level.

In one possible implementation mode, when the information bits of a PDCCH are fixed, its aggregation level is mainly determined by the channel conditions. When the channel conditions of the terminal are good, a smaller aggregation level is used to transmit the PDCCH. When the channel conditions of the terminal are poor, a larger aggregation level is used to transmit the PDCCH.

In one possible implementation, PDCCH with different aggregation levels have the same quantity of repeated transmissions. For example, the aggregation level configured in the search space configuration parameter is {1, 2, 4, 8}, and the corresponding configured aggregation level {1, 2, 4, 8} supports the quantity of repeated transmissions {R1, R2}, that is, regardless of the aggregation level of the PDCCH being transmitted, R1 transmissions or R2 transmissions will be performed, where R1 is not equal to R2;

or, for PDCCH with different aggregation levels, there are differences in the quantities of repeated transmissions corresponding to PDCCH with different aggregation levels. For example, the aggregation level configured in the search space configuration parameter is {1, 2, 4, 8}, the corresponding configured aggregation level {1, 2} supports the quantity of repeated transmissions R1, and the aggregation level {4, 8} supports the quantity of repeated transmissions {R1, R2}.

In one possible implementation mode, the correspondence between the aggregation level and the quantity of repeated transmissions is preset;

or, the correspondence between the aggregation level and the quantity of repeated transmissions is configured by the base station.

In one possible implementation, when the correspondence between the aggregation level and the quantity of repeated transmissions is preset, it is set in the communication protocol. After the aggregation level is determined, the quantity of repeated transmissions can be determined, making the process of determining the quantity of repeated transmissions efficient and fast.

In one possible implementation, when the correspondence between the aggregation level and the quantity of repeated transmissions is configured by the base station, the base station configures the correspondence between the aggregation level and the quantity of repeated transmissions through the search space configuration parameter, or the base station configures the correspondence between the aggregation level and the quantity of repeated transmissions through other signaling. After the aggregation level is determined, the base station configures the quantity of repeated transmissions according to the current control resource occupation, which has high flexibility.

At step 520, at least one candidate time unit corresponding to the quantity of repeated transmissions is determined according to the search space configuration parameters. Each candidate time unit includes N subunits, and N is determined by the quantity of repeated transmissions.

For the implementation process of step 520, reference can be made to the relevant description of step 420 in the embodiment of FIG. 4, and will not be repeated here.

At step 530, the aggregation level is determined, and at least one candidate transmission location is determined in the control resource set according to the determined aggregation level.

In one possible implementation, for PDCCH with the same aggregation level, there are multiple candidate transmission locations. The candidate transmission locations corresponding to the aggregation level can be calculated through the mapping relationship between the aggregation level and the candidate transmission locations, which is preset by the communication protocol or configured by the base station. Please refer to FIG. 6, which shows a schematic diagram of candidate transmission locations in an exemplary embodiment of the present disclosure. Taking the aggregation level as 4, suppose that when the aggregation level is 4, there are two candidate transmission locations calculated through the mapping relationship, namely candidate transmission location 1 and candidate transmission location 2. As shown in FIG. 4, the CCEs constituting the same candidate transmission location are numbered consecutively, and the CCEs constituting candidate transmission location 1 are numbered CCE #0~CCE #3, the CCEs constituting candidate transmission location 2 are numbered CCE #4~CCE #7.

It should be noted that in one possible implementation, CCE numbers between different candidate transmission locations are discontinuous. For example, CCE numbers that constitute candidate transmission location 1 are CCE #0~CCE #3, and CCE numbers that constitute candidate transmission location 2 are CCE #8~CCE #11.

In one possible implementation, at least two candidate transmission locations corresponding to the same aggregation level support the same quantity of repeated transmissions.

Figure 6:
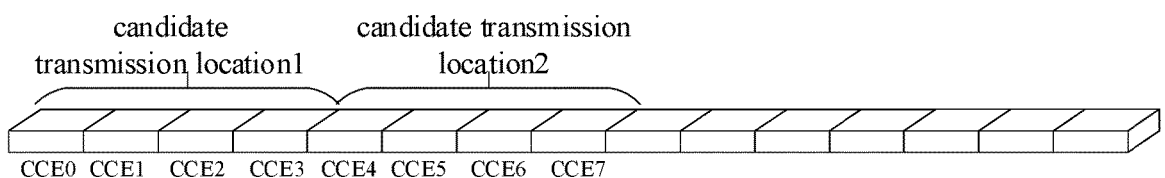
FIG. 6 shows a schematic diagram of candidate transmission locations in an exemplary embodiment of the present disclosure.

For example, for the two candidate transmission locations shown in FIG. 6 above when the aggregation level is 4, candidate transmission location 1 and candidate transmission location 2 both support {R1, R2} times of transmission, that is, when the quantity of repeated transmissions is R1, it is possible to choose to transmit PDCCH on candidate transmission location 1 or candidate transmission location 2; when the quantity of repeated transmissions is R2, it is possible to choose to transmit PDCCH on either candidate transmission location 1 or candidate transmission location 2.

Or, the at least two candidate transmission locations corresponding to the same aggregation level support different quantities of repeated transmissions.

For example, for the two candidate transmission locations shown in FIG. 6 above when the aggregation level is 4, candidate transmission location 1 only supports R1 transmissions, and candidate transmission location 2 supports {R1, R2} transmissions. That is, when the quantity of repeated transmissions is R1, it is possible to choose to transmit PDCCH on candidate transmission location 1 or candidate transmission location 2; when the quantity of repeated transmissions is R2, PDCCH can only be transmitted at candidate transmission location 2.

In one possible implementation, the quantity of repeated transmissions supported by each of at least two candidate transmission locations corresponding to the same aggregation level is preset;

or, the quantity of repeated transmissions supported by each of at least two candidate transmission locations corresponding to the same aggregation level is configured by the base station.

In one possible implementation, when the quantity of repeated transmissions supported by each of at least two candidate transmission locations corresponding to the same aggregation level is preset, it is set in the communication protocol.

In one possible implementation, when the quantity of repeated transmissions supported by each of at least two candidate transmission locations corresponding to the same aggregation level is configured by the base station, the base station configures the quantity of repeated transmissions supported by each of at least two candidate transmission locations corresponding to the same aggregation level through the search space configuration parameter, or, the base station configures the quantity of repeated transmissions supported by each of at least two candidate transmission locations corresponding to the same aggregation level through other signaling.

At step 540, PDCCH is transmitted to the terminal once respectively at the target candidate transmission locations corresponding to the N time subunits of the target candidate time unit.

The target candidate transmission location is any one of at least one candidate transmission location.

Figure 7:
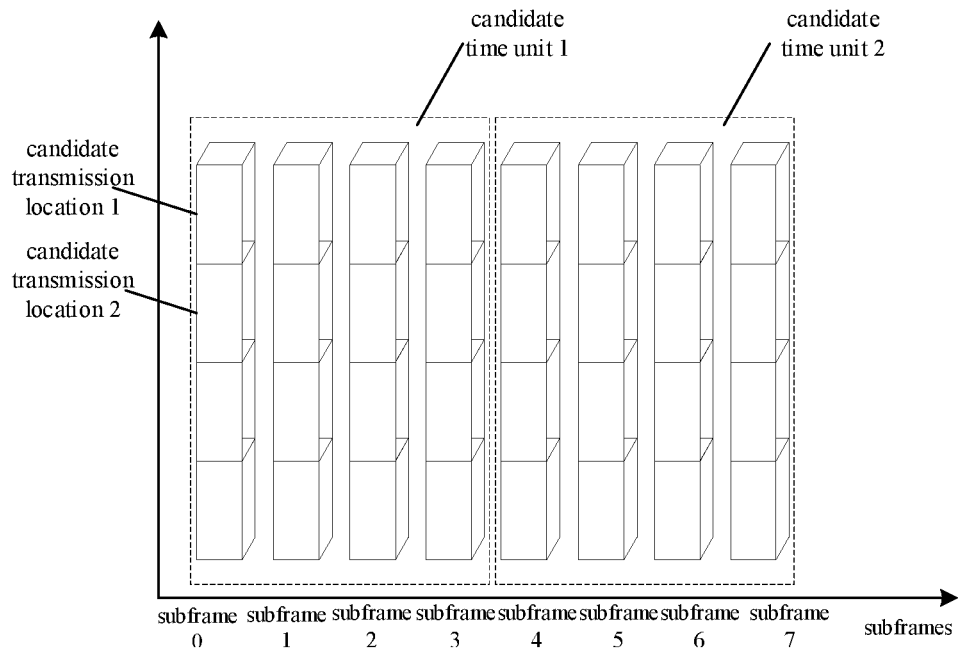
FIG. 7 shows a schematic diagram of candidate time units in an exemplary embodiment of the present disclosure.

The target candidate time unit is any one of at least one candidate time unit. Taking the aggregation level as 4 and the quantity of repeated transmissions as 4 as an example, please refer to FIG. 7, which shows a schematic diagram of candidate time units in an exemplary embodiment of the present disclosure. As shown in FIG. 7, assuming that the number of candidate time units corresponding to the aggregation level of 4 is 2, that is, the candidate time unit 1 and the candidate time unit 2 in FIG. 7, each candidate time unit contains a number of time subunits equal to the quantity of repeated transmissions. Taking the time subunit being a subframe as an example, the starting position of each candidate time unit is calculated through calculation. Four consecutive subframes from the starting position form one candidate time unit. For example, in FIG. 7, candidate time unit 1 includes subframes 0 to 3, and candidate time unit 2 includes subframes 4 to 7. In each subframe of each candidate time unit, there is at least one candidate transmission location. When the aggregation level is 4, the number of candidate transmission locations obtained according to the mapping relationship is 2, which corresponds to that there are candidate transmission locations 1 and 2 in FIG. 7, and the quantity of repeated transmissions supported on each candidate transmission location is the same or different, if the quantity of repeated transmissions supported at each candidate transmission location is the same, assuming that all of them support 4 repeated transmissions, then when the PDCCH with aggregation level 4 is repeatedly transmitted with 4 repeated transmissions, any of the two candidate time units can be selected as the target candidate time unit, and any one of the two candidate transmission locations in the target candidate time unit can be selected as the target candidate transmission location for transmission; if the quantity of repeated transmissions supported by each candidate transmission location is different, assuming that candidate transmission location 1 only supports the quantity of repeated transmissions 2, and candidate transmission location 2 supports the quantity of repeated transmissions 4, then when the PDCCH with aggregation level 4 is retransmitted with the quantity of repeated transmissions 4, any one of the two candidate time units can be selected as the target candidate time unit, and candidate transmission location 2 in the target candidate time unit can be selected as the target candidate transmission location for transmission.

It should be noted that the time subunits in the same candidate time unit group are continuous, but the time subunits between different candidate time unit groups are continuous or discontinuous. For example, in one possible case, according to the calculation formula of the starting position of the candidate time unit, candidate time unit group 1 includes subframe 0~subframe 3, and candidate time unit group 2 includes subframe 4~subframe 7, then the time subunits between the candidate time unit groups are continuous. In one possible case, according to the calculation formula of the starting position of the candidate time unit, it can be calculated that the candidate time unit group 1 includes subframe 0~subframe 3, and the candidate time unit group 2 includes subframe 8~subframe 11, then the time subunits between the candidate time unit groups are discontinuous.

To sum up, in the method for transmitting the physical downlink control channel provided by the present disclosure, during the transmission of the physical downlink control channel, the base station sends the search space configuration parameter for the terminal including the quantity of repeated transmissions, determines at least one candidate time unit corresponding to the quantity of repeated transmissions according to the search space configuration parameter, and transmits PDCCH to the terminal on the target time unit of at least one candidate time unit according to the quantity of repeated transmissions. Thus, the repeated transmission of PDCCH is realized.

Figure 8:
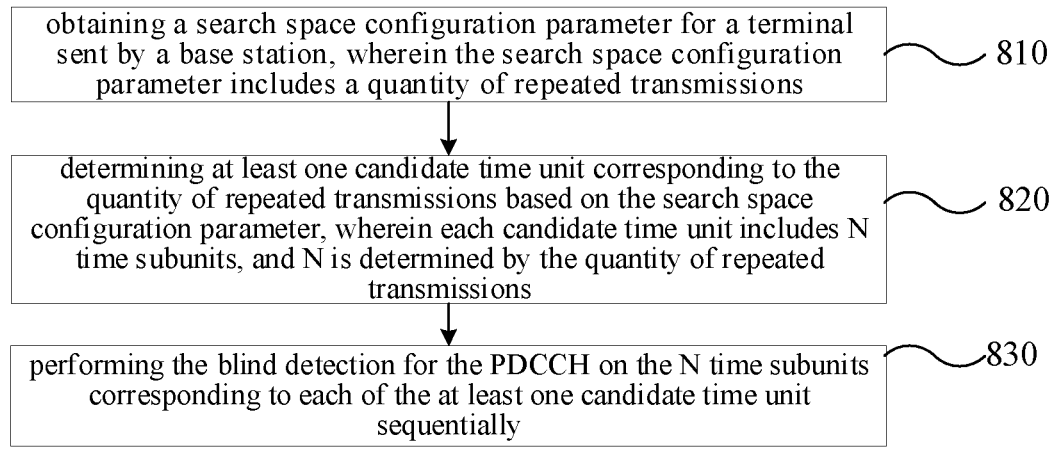
FIG. 8 shows a flow chart of a method for transmitting a physical downlink control channel provided by an embodiment of the present disclosure.

Referring to FIG. 8, which shows a flow chart of a method for transmitting a physical downlink control channel provided by an embodiment of the present disclosure. The method for transmitting the physical downlink control channel can be applied to the system for transmitting the physical downlink control channel shown in FIG. 1, and performed by the terminal in FIG. 1. The method includes the following steps.

At step 810, a search space configuration parameter for the terminal sent by the base station is obtained. The search space configuration parameter includes a quantity of repeated transmissions.

In one possible implementation, for the same terminal, since the same terminal corresponds to multiple PDCCH aggregation levels, and different PDCCH aggregation levels correspond to multiple quantities of repeated transmissions and different candidate time units, the search space configuration information includes the PDCCH aggregation levels, quantities of repeated transmissions and candidate time units that the terminal may correspond to, When the terminal receives the PDCCH transmitted by the base station, it detects the candidate control channel indicated by the search space configuration information based on the search space configuration information to receive the PDCCH. The search space configuration information determines the candidate control channel indicated, which is the search space for the terminal to receive the PDCCH.

At step 820, at least one candidate time unit corresponding to the quantity of repeated transmissions is determined according to the search space configuration parameter. Each candidate time unit includes N time subunits, and N is determined by the quantity of repeated transmissions.

In one possible implementation, the terminal determines the start time position of at least one candidate time unit according to the quantity of repeated transmissions; and determines N time subunits respectively starting from the start time position of at least one candidate time unit as at least one candidate time unit.

In one possible implementation, when the search space configuration parameter contains at least two quantities of repeated transmissions, the at least two quantities of repeated transmissions correspond to the same number of candidate time units;

or, the at least two quantities of repeated transmissions correspond to different number of candidate time units.

In one possible implementation, the number of candidate time units corresponding to the quantity of repeated transmissions is preset;

or, the number of candidate time units corresponding to the quantity of repeated transmissions is configured by the base station.

At step 830, blind detection of PDCCH is performed on N time subunits corresponding to at least one candidate time unit sequentially.

When the base station transmits PDCCH to the terminal and the terminal receives the PDCCH transmitted by the base station, the base station determines the target candidate time unit and the specified quantity of repeated transmissions for PDCCH transmission from at least one candidate time unit and at least one quantity of repeated transmissions according to the channel conditions of the PDCCH, and transmits PDCCH based on the determined unique target candidate time unit and the specified quantity of repeated transmissions. However, for the terminal, the terminal cannot accurately determine the target candidate time unit and the specified quantity of repeated transmissions for the PDCCH transmitted by the base station. However, the terminal obtains all the possibilities of the base station to send PDCCH according to the search space configuration information sent by the base station through the high-level signaling, that is, the candidate time unit and the possible quantity of repeated transmissions of the PDCCH sent by the base station, so as to perform blind detection for all possible situations until the PDCCH corresponding to the terminal is received.

To sum up, in the method for transmitting the physical downlink control channel provided by the present disclosure, during the transmission of the physical downlink control channel, the terminal obtains the search space configuration parameter for the terminal containing the quantity of repeated transmissions sent by the base station, and determines at least one candidate time unit corresponding to the quantity of repeated transmissions according to the search space configuration parameter, and performs the blind detection of PDCCH sequentially on at least one candidate time unit according to the quantity of repeated transmissions, thus realizing the repeated transmission of PDCCH.

In one possible implementation, the search space configuration parameter includes the aggregation level corresponding to the quantity of repeated transmissions. Please refer to FIG. 9, which shows a flow chart of a method for transmitting a physical downlink control channel provided by an embodiment of the disclosure. The method for transmitting the physical downlink control channel can be applied to the system for transmitting the physical downlink control channel shown in FIG. 1, and performed by the terminal in FIG. 1. The method includes the following steps.

At step 910, a search space configuration parameter for the terminal sent by the base station is obtained, and the search space configuration parameter includes a quantity of repeated transmissions.

In one possible implementation, the search space configuration parameter includes at least two aggregation levels, and each aggregation level corresponds to at least one quantity of repeated transmissions;

at least two aggregation levels correspond to the same quantity of repeated transmissions;

or, at least two aggregation levels correspond to different quantities of repeat transmissions.

In one possible implementation, the correspondence between the aggregation level and the quantity of repeated transmissions is preset;

or, the correspondence between the aggregation level and the quantity of repeated transmissions is configured by the base station.

At step 920, at least one candidate time unit corresponding to the quantity of repeated transmissions is determined according to the search space configuration parameter. Each candidate time unit includes N time subunits, and N is determined by the quantity of repeated transmissions.

At step 930, the aggregation level is determined, and at least one candidate transmission location is determined in the control resource set according to the determined aggregation level.

In one possible implementation, at least two candidate transmission locations corresponding to the same aggregation level support the same quantity of repeated transmissions;

or, at least two candidate transmission locations corresponding to the same aggregation level support different quantities of repeated transmissions.

In one possible implementation mode, the quantity of repeated transmissions supported by each of at least two candidate transmission locations corresponding to the same aggregation level is preset;

or, the quantity of repeated transmissions supported by each of at least two candidate transmission locations corresponding to the same aggregation level is configured by the base station.

At step 940, blind detection of PDCCH is performed once respectively on the corresponding candidate transmission positions of N time subunits in at least one candidate time unit;

The target candidate transmission location is any one of at least one candidate transmission location.

When the search space configuration parameter contains the aggregation level corresponding to the quantity of repeated transmissions, the terminal calculates the candidate transmission location of PDCCH based on the aggregation level, so as to further narrow the scope of blind detection by the terminal, that is, the terminal only needs to perform blind detection on the corresponding candidate transmission positions of N time subunits in the possible candidate time units until PDCCH belonging to the terminal is obtained.

To sum up, in the method for transmitting the physical downlink control channel provided by the present disclosure, during the transmission of the physical downlink control channel, the terminal obtains the search space configuration parameter for the terminal containing the quantity of repeated transmissions sent by the base station, and determines at least one candidate time unit corresponding to the quantity of repeated transmissions according to the search space configuration parameter, and performs blind detection of PDCCH sequentially on the at least one candidate time unit according to the quantity of repeated transmissions, thus realizing the repeated transmission of PDCCH.

Figure 2:
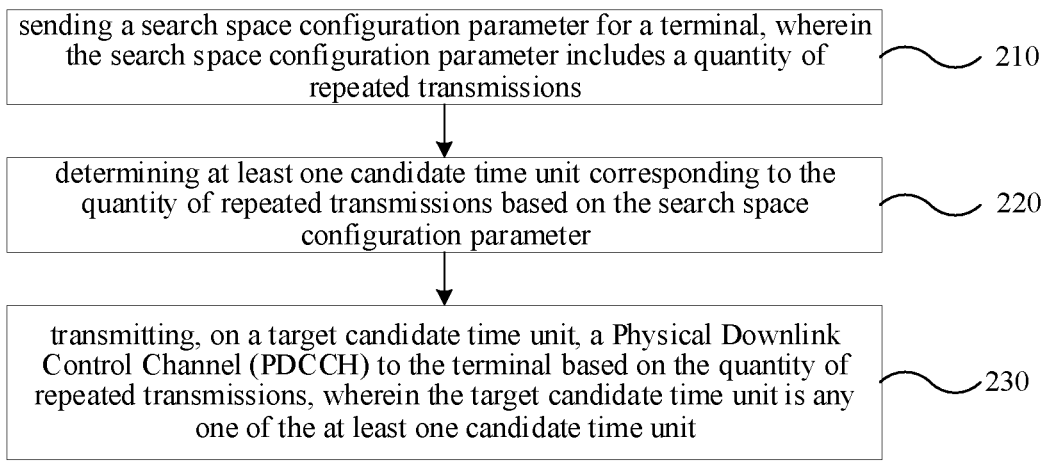
FIG. 2 shows a flow chart of a method for transmitting a physical downlink control channel provided by an embodiment of the present disclosure.
Figure 5:
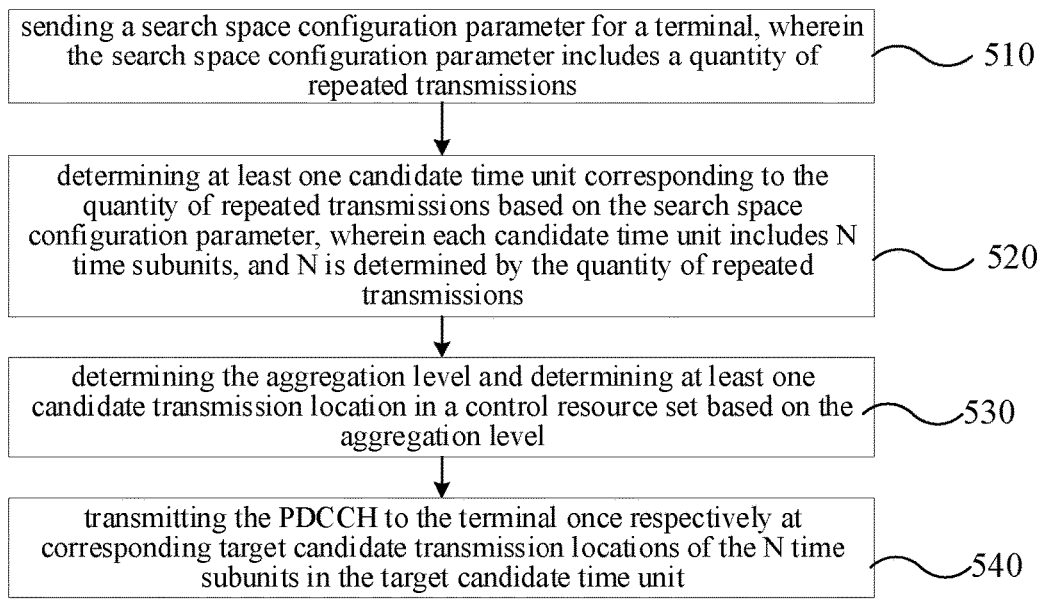
FIG. 5 shows a flow chart of a method for transmitting a physical downlink control channel provided by an embodiment of the present disclosure.
Figure 10:
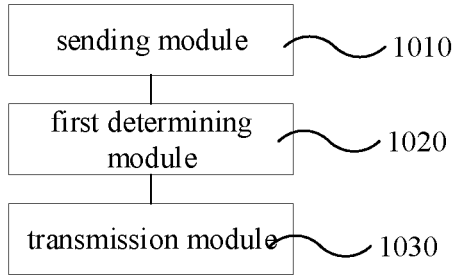
FIG. 10 is a block diagram of an apparatus for transmitting a physical downlink control channel according to an exemplary embodiment.

FIG. 10 is a block diagram of an apparatus for transmitting a physical downlink control channel according to an exemplary embodiment, which is applied to a base station to perform all or part of the steps of the method shown in any of the embodiments of FIG. 2, FIG. 4 or FIG. 5 above. The above base station may be the base station in the system for transmitting the physical downlink control channel as shown in FIG. 1. As shown in FIG. 10, the apparatus for transmitting the physical downlink control channel includes:

a sending module 1010, configured to send a search space configuration parameter for a terminal, wherein the search space configuration parameter includes a quantity of repeated transmissions;

a first determining module 1020, configured to determine at least one candidate time unit corresponding to the quantity of repeated transmissions based on the search space configuration parameter; and a transmission module 1030, configured to transmit, on a target candidate time unit, a Physical Downlink Control Channel (PDCCH) to the terminal based on the quantity of repeated transmissions, wherein the target candidate time unit is any one of the at least one candidate time unit.

In a possible implementation, each candidate time unit includes N time subunits, and N is determined by the quantity of repeated transmissions; and the transmission module 1030 is configured to: transmit the PDCCH to the terminal repeatedly on the N time subunits in the target candidate time unit.

In a possible implementation, the first determining module 1020 includes:

a first determining submodule, configured to determine a start time position of the at least one candidate time unit based on the quantity of repeated transmissions; and a second determining submodule, configured to determine N time subunits respectively starting from the start time position of the at least one candidate time unit as the at least one candidate time unit corresponding to the quantity of repeated transmissions.

In a possible implementation, the search space configuration parameter includes an aggregation level corresponding to the quantity of repeated transmissions;

before transmitting the PDCCH to the terminal repeatedly on the N time subunits in the target candidate time unit, the apparatus further includes:

a second determining module, configured to determine the aggregation level and determine at least one candidate transmission location in a control resource set based on the aggregation level; wherein the transmission module 1030 is configured to: transmit the PDCCH to the terminal once respectively at corresponding target candidate transmission locations of the N time subunits in the target candidate time unit; and the target candidate transmission location is any one of the at least one candidate transmission location.

In a possible implementation, the search space configuration parameter includes at least two aggregation levels, each aggregation level corresponds to at least one quantity of repeated transmissions;

at least two aggregation levels correspond to a same quantity of repeated transmissions;

or, the at least two aggregation levels correspond to different quantities of repeated transmissions.

In a possible implementation, a correspondence between the aggregation level and the quantity of repeated transmissions is preset;

or, a correspondence between the aggregation level and the quantity of repeated transmissions is configured by a base station.

In a possible implementation, at least two candidate transmission locations corresponding to the same aggregation level support a same quantity of repeated transmissions;

or, at least two candidate transmission locations corresponding to the same aggregation level support different quantities of repeated transmissions.

In a possible implementation, the quantity of repeated transmissions supported by each of at least two candidate transmission locations corresponding to the same aggregation level is preset;

or, the quantity of repeated transmissions supported by each of at least two candidate transmission locations corresponding to the same aggregation level is configured by the base station.

In a possible implementation, in response to the search space configuration parameter including at least two quantities of repeated transmissions, the at least two quantities of repeated transmissions correspond to a same number of candidate time units;

or, the at least two quantities of repeated transmissions correspond to different number of candidate time units.

In a possible implementation, the number of candidate time units corresponding to the quantity of repeated transmissions is preset;

or, the number of candidate time units corresponding to the quantity of repeated transmissions is configured by the base station.

To sum up, the apparatus for transmitting the physical downlink control channel provided by the present disclosure is applied to the base station. In the transmission process of the physical downlink control channel, the search space configuration parameter for the terminal including the quantity of repeated transmissions is sent, at least one candidate time unit corresponding to the quantity of repeated transmissions is determined according to the search space configuration parameter, and PDCCH is transmitted to the terminal on the target time unit of at least one candidate time unit according to the quantity of repeated transmissions, thereby realizing the repeated transmission of PDCCH.

Figure 11:
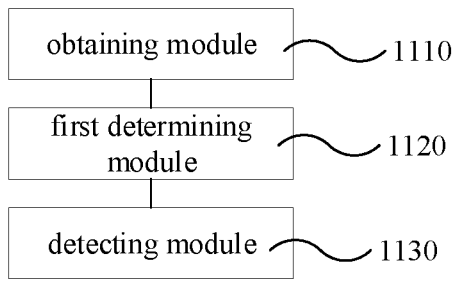
FIG. 11 is a block diagram of an apparatus for transmitting a physical downlink control channel according to an exemplary embodiment.

FIG. 11 is a block diagram of an apparatus for transmitting a physical downlink control channel according to an exemplary embodiment. The apparatus for transmitting the physical downlink control channel is applied in a terminal to perform all or part of the steps of the method shown in any of the embodiments of FIG. 3, FIG. 8, or FIG. 9 above. The above terminal may be the terminal in the system for transmitting the physical downlink control channel as shown in FIG. 1. As shown in FIG. 11, the apparatus includes:

an obtaining module 1110, configured to obtain a search space configuration parameter for a terminal sent by a base station, wherein the search space configuration parameter includes a quantity of repeated transmissions;

a first determining module 1120, configured to determine at least one candidate time unit corresponding to the quantity of repeated transmissions based on the search space configuration parameter; and a detecting module 1130, configured to perform blind detection of Physical Downlink Control Channel (PDCCH) on the at least one candidate time unit sequentially based on the quantity of repeated transmissions.

In a possible implementation, each candidate time unit includes N time subunits, and N is determined by the quantity of repeated transmissions; and the detecting module 1130 is configured to: perform the blind detection of PDCCH sequentially on the N time subunits corresponding to the at least one candidate time unit.

In a possible implementation, the first determining module 1120 includes:

a first determining submodule, configured to determine a start time position of the at least one candidate time unit based on the quantity of repeated transmissions; and a second determining submodule, configured to determine N time subunits respectively starting from the start time position of the at least one candidate time unit as the at least one candidate time unit.

In a possible implementation, the search space configuration parameter includes an aggregation level corresponding to the quantity of repeated transmissions;

before performing the blind detection of PDCCH sequentially on the at least one candidate time unit, the apparatus further includes:

a second determining module, configured to determine the aggregation level and determine at least one candidate transmission location in a control resource set based on the aggregation level; wherein the detecting module 1130 is configured to: perform the blind detection of PDCCH once respectively at corresponding candidate transmission locations of the N time subunits in the at least one candidate time unit.

In a possible implementation, the search space configuration parameter includes at least two aggregation levels, each aggregation level corresponds to at least one quantity of repeated transmissions;

at least two aggregation levels correspond to a same quantity of repeated transmissions;

or, at least two aggregation levels correspond to different quantities of repeated transmissions.

In a possible implementation, a correspondence between the aggregation level and the quantity of repeated transmissions is preset;

or, a correspondence between the aggregation level and the quantity of repeated transmissions is configured by the base station.

In a possible implementation, at least two candidate transmission locations corresponding to the same aggregation level support a same quantity of repeated transmissions;

or, at least two candidate transmission locations corresponding to the same aggregation level support different quantities of repeated transmissions.

In a possible implementation, the quantity of repeated transmissions supported by each of at least two candidate transmission locations corresponding to the same aggregation level is preset;

or, the quantity of repeated transmissions supported by each of at least two candidate transmission locations corresponding to the same aggregation level is configured by the base station.

In a possible implementation, in response to the search space configuration parameter including at least two quantities of repeated transmissions, the at least two quantities of repeated transmissions each correspond to a same number of candidate time units;

or, the at least two quantities of repeated transmissions correspond to different number of candidate time units.

In a possible implementation, the number of candidate time units corresponding to the quantity of repeated transmissions is preset;

or, the number of candidate time units corresponding to the quantity of repeated transmissions is configured by the base station.

To sum up, the apparatus for transmitting the physical downlink control channel provided by the present disclosure is applied to the terminal. During the transmission of the physical downlink control channel, the search space configuration parameter for the terminal containing the quantity of repeated transmissions sent by the base station are obtained, and at least one candidate time unit corresponding to the quantity of repeated transmissions is determined according to the search space configuration parameter, and blind detection of PDCCH is performed sequentially on the at least one candidate time unit according to the quantity of repeated transmissions, thus realizing the repeated transmission of PDCCH.

An exemplary embodiment of the present disclosure provides a base station capable of implementing all or part of the steps of the method shown in any of the embodiments of FIG. 2, 4, or 5 of the present disclosure. The above base station may be the base station in the system for transmitting the physical downlink control channel as shown in FIG. 1. The base station includes:

a processor;

a transceiver connected to the processor; and a memory for storing instructions executable by the processor;

wherein the process is configured to:

send a search space configuration parameter for a terminal, wherein the search space configuration parameter includes a quantity of repeated transmissions;

determine at least one candidate time unit corresponding to the quantity of repeated transmissions based on the search space configuration parameter; and transmit, on a target candidate time unit, a Physical Downlink Control Channel (PDCCH) to the terminal based on the quantity of repeated transmissions, wherein the target candidate time unit is any one of the at least one candidate time unit.

In a possible implementation, each candidate time unit includes N time subunits, and N is determined by the quantity of repeated transmissions; and transmitting, on the target candidate time unit, the PDCCH to the terminal based on the quantity of repeated transmissions, includes:

transmitting the PDCCH to the terminal repeatedly on the N time subunits in the target candidate time unit.

In a possible implementation, determining the at least one candidate time unit corresponding to the quantity of repeated transmissions based on the search space configuration parameter, includes:

determining a start time position of the at least one candidate time unit based on the quantity of repeated transmissions; and determining N time subunits respectively starting from the start time position of the at least one candidate time unit as the at least one candidate time unit corresponding to the quantity of repeated transmissions.

In a possible implementation, the search space configuration parameter includes an aggregation level corresponding to the quantity of repeated transmissions;

before transmitting the PDCCH to the terminal repeatedly on the N time subunits in the target candidate time unit, the method further includes:

determining the aggregation level and determining at least one candidate transmission location in a control resource set based on the aggregation level;

wherein transmitting the PDCCH to the terminal repeatedly on the N time subunits in the target candidate time unit, includes:

transmitting the PDCCH to the terminal once respectively at corresponding target candidate transmission locations of the N time subunits in the target candidate time unit;

wherein the target candidate transmission location is any one of the at least one candidate transmission location.

In a possible implementation, the search space configuration parameter includes at least two aggregation levels, each aggregation level corresponds to at least one quantity of repeated transmissions;

at least two aggregation levels correspond to a same quantity of repeated transmissions;

or, at least two aggregation levels correspond to different quantities of repeated transmissions.

In a possible implementation, a correspondence between the aggregation level and the quantity of repeated transmissions is preset;

or, a correspondence between the aggregation level and the quantity of repeated transmissions is configured by a base station.

In a possible implementation, at least two candidate transmission locations corresponding to the same aggregation level support a same quantity of repeated transmissions;

or, at least two candidate transmission locations corresponding to the same aggregation level support different quantities of repeated transmissions.

In a possible implementation, the quantity of repeated transmissions supported by each of the at least two candidate transmission locations corresponding to the same aggregation level is preset;

or, the quantity of repeated transmissions supported by each of the at least two candidate transmission locations corresponding to the same aggregation level is configured by a base station.

In a possible implementation, in response to the search space configuration parameter including at least two quantities of repeated transmissions, the at least two quantities of repeated transmissions correspond to a same number of candidate time units;

or, the at least two quantities of repeated transmissions correspond to different number of candidate time units.

In a possible implementation, the number of candidate time units corresponding to the quantity of repeated transmissions is preset;

or, the number of candidate time units corresponding to the quantity of repeated transmissions is configured by a base station.

To sum up, the base station provided by the present disclosure, during the transmission of the physical downlink control channel, sends the search space configuration parameter for the terminal containing the quantity of repeated transmissions, determines at least one candidate time unit corresponding to the quantity of repeated transmissions according to the search space configuration parameter, and transmits PDCCH to the terminal on the target time unit of at least one candidate time unit according to the quantity of repeated transmissions, Thus, the repeated transmission of PDCCH is realized.

Figure 9:
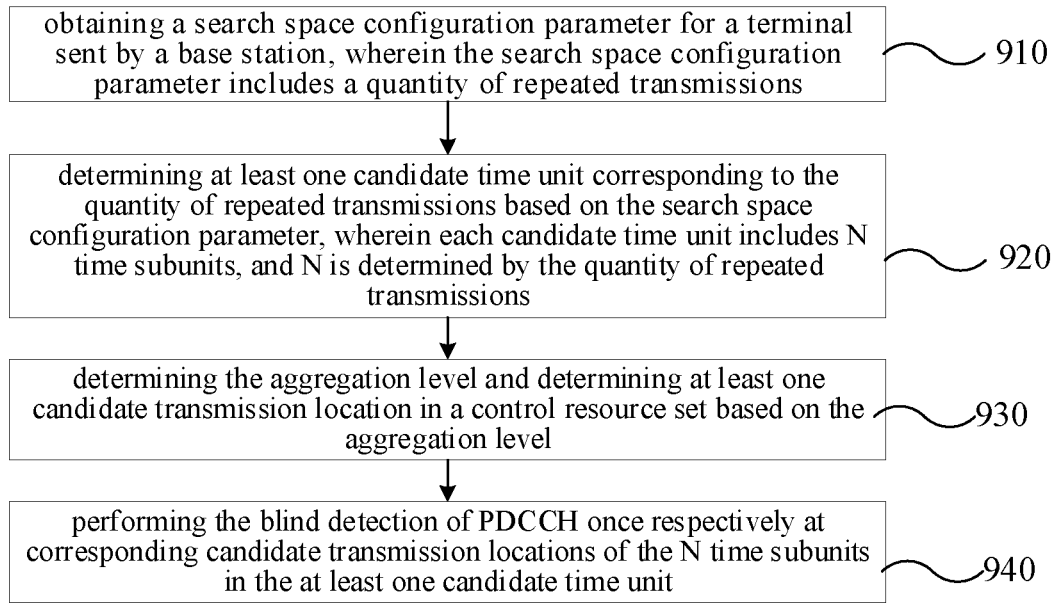
FIG. 9 shows a flow chart of a method for transmitting a physical downlink control channel provided by an embodiment of the present disclosure.

An exemplary embodiment of the present disclosure provides a terminal capable of implementing all or part of the steps of the method shown in any of the embodiments of FIG. 3, 8, or 9 of the present disclosure. The above terminal may be the terminal in the system for transmitting the physical downlink control channel as shown in FIG. 1. The terminal includes:

a processor;

a transceiver connected to the processor; and a memory for storing instructions executable by the processor;

wherein the process is configured to:

obtain a search space configuration parameter for a terminal sent by a base station, wherein the search space configuration parameter includes a quantity of repeated transmissions;

determine at least one candidate time unit corresponding to the quantity of repeated transmissions based on the search space configuration parameter; and perform blind detection of Physical Downlink Control Channel (PDCCH) on the at least one candidate time unit sequentially based on the quantity of repeated transmissions.

In a possible implementation, each candidate time unit includes N time subunits, and N is determined by the quantity of repeated transmissions; and performing the blind detection of PDCCH on the at least one candidate time unit sequentially based on the quantity of repeated transmissions, includes:

performing the blind detection for the PDCCH on the N time subunits corresponding to each of the at least one candidate time unit sequentially.

In a possible implementation, determining the at least one candidate time unit corresponding to the quantity of repeated transmissions based on the search space configuration parameter, includes:

determining a start time position of the at least one candidate time unit based on the quantity of repeated transmissions; and determining N time subunits respectively starting from the start time position of the at least one candidate time unit as the at least one candidate time unit.

In a possible implementation, the search space configuration parameter includes an aggregation level corresponding to the quantity of repeated transmissions;

before performing the blind detection of PDCCH on the at least one candidate time unit sequentially, the method further includes:

determining the aggregation level and determining at least one candidate transmission location in a control resource set based on the aggregation level; wherein performing the blind detection of PDCCH on the at least one candidate time unit sequentially, includes:

performing the blind detection of PDCCH once respectively at corresponding candidate transmission locations of the N time subunits in the at least one candidate time unit.

In a possible implementation, the search space configuration parameter includes at least two aggregation levels, each aggregation level corresponds to at least one quantity of repeated transmissions;

at least two aggregation levels correspond to a same quantity of repeated transmissions;

or, at least two aggregation levels correspond to different quantities of repeated transmissions.

In a possible implementation, a correspondence between the aggregation level and the quantity of repeated transmissions is preset;

or, a correspondence between the aggregation level and the quantity of repeated transmissions is configured by the base station.

In a possible implementation, at least two candidate transmission locations corresponding to the same aggregation level support a same quantity of repeated transmissions;

or, at least two candidate transmission locations corresponding to the same aggregation level support different quantities of repeated transmissions.

In a possible implementation, the quantity of repeated transmissions supported by each of at least two candidate transmission locations corresponding to the same aggregation level is preset;

or, the quantity of repeated transmissions supported by each of at least two candidate transmission locations corresponding to the same aggregation level is configured by the base station.

In a possible implementation, in response to the search space configuration parameter including at least two quantities of repeated transmissions, the at least two quantities of repeated transmissions correspond to a same number of candidate time units;

or, the at least two quantities of repeated transmissions correspond to different number of candidate time units.

In a possible implementation, the number of candidate time units corresponding to the quantity of repeated transmissions is preset;

or, the number of candidate time units corresponding to the quantity of repeated transmissions is configured by the base station.

To sum up, the terminal provided in the present disclosure, during the transmission of the physical downlink control channel, obtains the search space configuration parameter for the terminal containing the quantity of repeated transmissions sent by the base station, determines at least one candidate time unit corresponding to the quantity of repeated transmissions according to the search space configuration parameters, and performs blind detection of PDCCH on at least one candidate time unit sequentially according to the quantity of repeated transmissions. Thus, the repeated transmission of PDCCH is realized.

Figure 12:
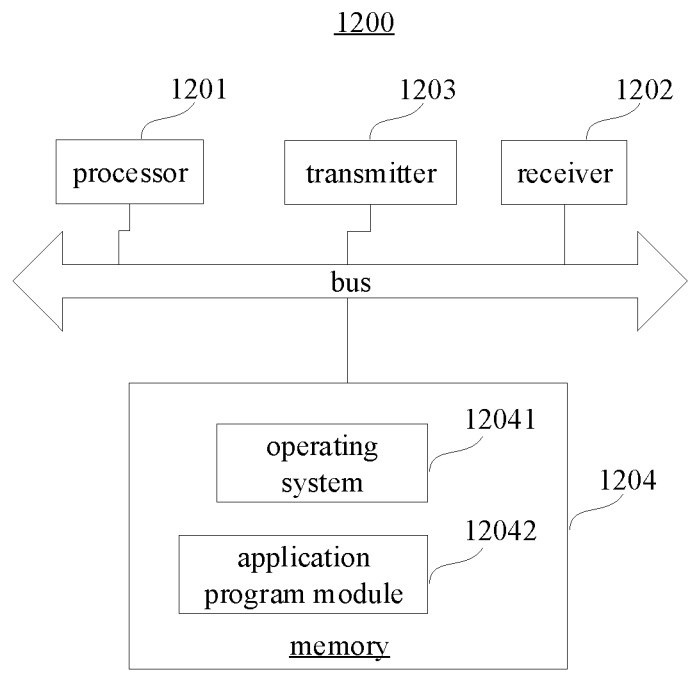
FIG. 12 shows a schematic diagram of an access network device (base station) provided by an exemplary embodiment of the present disclosure.

FIG. 12 shows a schematic diagram of an access network device (base station) provided by an exemplary embodiment of the present disclosure.

The access network device 1200 may include a processor 1201, a receiver 1202, a transmitter 1203, and a memory 1204. The receiver 1202, transmitter 1203 and memory 1204 are respectively connected with the processor 1201 via a bus.

The processor 1201 includes one or more processing cores. The processor 1201 executes the method executed by the access network device in the scheduling method of the transmission block provided by embodiments of the present disclosure by running software programs and modules. The memory 1204 may be used to store software programs and modules. Specifically, the memory 1204 can store operating system 12041 and application program module 12042 required for at least one function. The receiver 1202 is used to receive communication data sent by other devices, and the transmitter 1203 is used to send communication data to other devices.

In an exemplary embodiment, a computer-readable storage medium is provided. The storage medium stores at least one instruction, at least one program, code set or instruction set, wherein when the at least one instruction, the at least one program, code set or instruction set are loaded and executed by a processor, the method for transmitting a physical downlink control channel with the base station as the execution subject in each of the above method embodiments is implemented.

Figure 13:
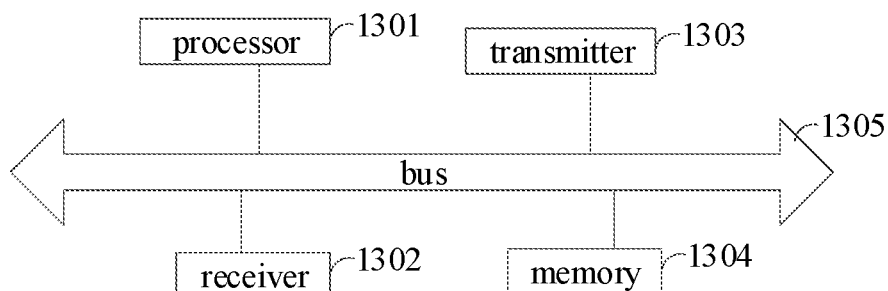
FIG. 13 shows a schematic diagram of a terminal provided by an exemplary embodiment of the present disclosure.

FIG. 13 shows a schematic diagram of a terminal provided by an exemplary embodiment of the present disclosure, which includes a processor 1301, a receiver 1302, a transmitter 1303, a memory 1304, and a bus 1305.

The processor 1301 includes one or more processing cores. The processor 1301 executes various functional applications and information processing by running software programs and modules.

The receiver 1302 and transmitter 1303 may be implemented as a communication component, which may be a communication chip.

The memory 1304 is connected to the processor 1301 via the bus 1305.

The memory 1304 may be used to store at least one instruction, and the processor 1301 may be used to execute the at least one instruction to implement the steps in the above method embodiments.

In addition, the memory 1304 can be realized by any type of volatile or non-volatile storage device or their combination. The volatile or non-volatile storage devices include but are not limited to: disk or optical disk, electrically erasable programmable read only memory (EEPROM), erasable programmable read only memory (EPROM), Static Random Access Memory (SRAM), Read Only Memory (ROM), Magnetic Memory, Flash Memory, Programmable Read Only Memory (PROM).

In an exemplary embodiment, a computer-readable storage medium is provided. The storage medium stores at least one instruction, at least one program, code set or instruction set, wherein when the at least one instruction, the at least one program, code set or instruction set are loaded and executed by a processor, the method for transmitting a physical downlink control channel with the terminal as the execution subject in each of the above method embodiments is implemented.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for transmitting a physical downlink control channel, performed by a base station, comprising:

sending a search space configuration parameter for a terminal, wherein the search space configuration parameter comprises a quantity of repeated transmissions and an aggregation level corresponding to the quantity of repeated transmissions;

determining a start time position of at least one candidate time unit based on the quantity of repeated transmissions; and determining N time subunits respectively starting from the start time position of the at least one candidate time unit as the at least one candidate time unit corresponding to the quantity of repeated transmissions, wherein N is determined by the quantity of repeated transmissions;

determining at least one candidate transmission location in a control resource set based on the aggregation level; and transmitting a Physical Downlink Control Channel (PDCCH) to the terminal once respectively at corresponding target candidate transmission locations of the N time subunits in the target candidate time unit; wherein the target candidate time unit is any one of the at least one candidate time unit, and wherein the target candidate transmission location is any one of the at least one candidate transmission location.

2. The method of claim 1, wherein the search space configuration parameter comprises at least two aggregation levels, each aggregation level corresponds to at least one quantity of repeated transmissions;

at least two aggregation levels correspond to a same quantity of repeated transmissions; or, at least two aggregation levels correspond to different quantities of repeated transmissions.

3. The method of claim 1, wherein,
a correspondence between the aggregation level and the quantity of repeated transmissions is preset; or,
a correspondence between the aggregation level and the quantity of repeated transmissions is configured by a base station.

4. The method of claim 1, wherein,
at least two candidate transmission locations corresponding to the same aggregation level support a same quantity of repeated transmissions; or,
at least two candidate transmission locations corresponding to the same aggregation level support different quantities of repeated transmissions.

5. The method of claim 4, wherein,
the quantity of repeated transmissions supported by each of the at least two candidate transmission locations corresponding to the same aggregation level is preset; or,
the quantity of repeated transmissions supported by each of the at least two candidate transmission locations corresponding to the same aggregation level is configured by a base station.

6. The method of claim 1, wherein in response to the search space configuration parameter comprising at least two quantities of repeated transmissions,
the at least two quantities of repeated transmissions correspond to a same number of candidate time units; or,
the at least two quantities of repeated transmissions correspond to different number of candidate time units.

7. The method of claim 6, wherein,
the number of candidate time units corresponding to the quantity of repeated transmissions is preset; or,
the number of candidate time units corresponding to the quantity of repeated transmissions is configured by a base station.

8. A method for transmitting a physical downlink control channel, performed by a terminal, comprising:
obtaining a search space configuration parameter of the terminal sent by a base station, wherein the search space configuration parameter comprises a quantity of repeated transmissions and an aggregation level corresponding to the quantity of repeated transmissions;
determining a start time position of at least one candidate time unit based on the quantity of repeated transmissions; and determining N time subunits respectively starting from the start time position of the at least one candidate time unit as the at least one candidate time unit corresponding to the quantity of repeated transmissions, wherein N is determined by the quantity of repeated transmissions;
determining at least one candidate transmission location in a control resource set based on the aggregation level; and
performing blind detection of Physical Downlink Control Channel (PDCCH) once respectively at corresponding candidate transmission locations of the N time subunits in the at least one candidate time unit.

9. The method of claim 8, wherein the search space configuration parameter comprises at least two aggregation levels, each aggregation level corresponds to at least one quantity of repeated transmissions;
at least two aggregation levels correspond to a same quantity of repeated transmissions; or,
at least two aggregation levels correspond to different quantities of repeated transmissions.

10. The method of claim 8, wherein
at least two candidate transmission locations corresponding to the same aggregation level support a same quantity of repeated transmissions; or,
at least two candidate transmission locations corresponding to the same aggregation level support different quantities of repeated transmissions.

11. The method of claim 8, wherein in response to the search space configuration parameter comprising at least two quantities of repeated transmissions,
the at least two quantities of repeated transmissions correspond to a same number of candidate time units; or
the at least two quantities of repeated transmissions correspond to different number of candidate time units.

12. A base station, configured to implement the method of claim 1, comprising:
a processor;
a transceiver connected to the processor; and
a memory for storing instructions executable by the processor.

13. A terminal, comprising:
a processor;
a transceiver connected to the processor; and
a memory for storing instructions executable by the processor;
wherein the processor, in response to execution of the instructions, is configured to:
obtain a search space configuration parameter for a terminal sent by a base station, wherein the search space configuration parameter comprises a quantity of repeated transmissions and an aggregation level corresponding to the quantity of repeated transmissions;
determine a start time position of at least one candidate time unit based on the quantity of repeated transmissions; and determine N time subunits respectively starting from the start time position of the at least one candidate time unit as the at least one candidate time unit corresponding to the quantity of repeated transmissions, wherein N is determined by the quantity of repeated transmissions;
determine at least one candidate transmission location in a control resource set based on the aggregation level; and
perform blind detection of Physical Downlink Control Channel (PDCCH) once respectively at corresponding candidate transmission locations of the N time subunits in the at least one candidate time unit.

* * * * *